United States Patent Office 3,078,671
Patented Feb. 26, 1963

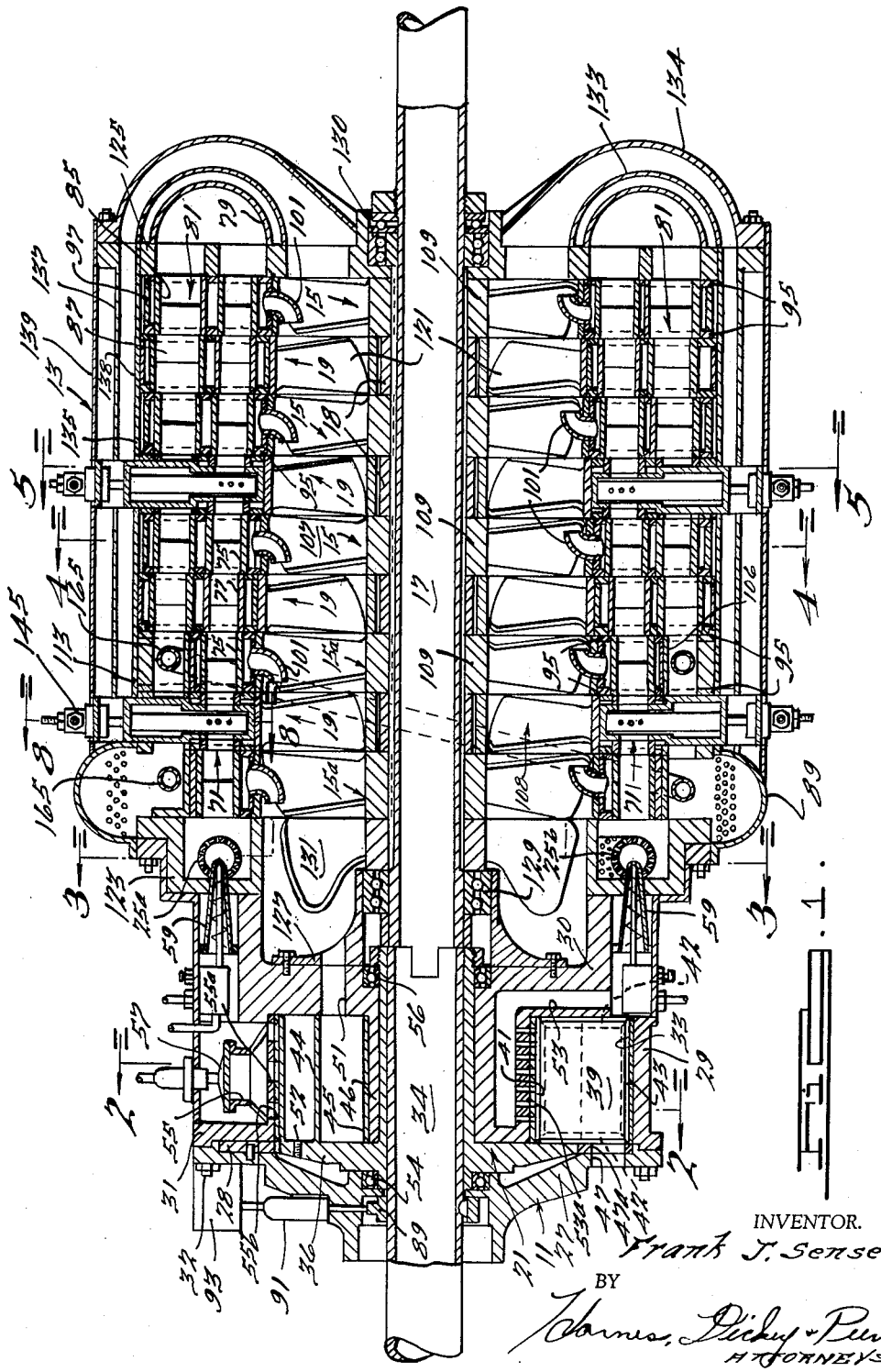

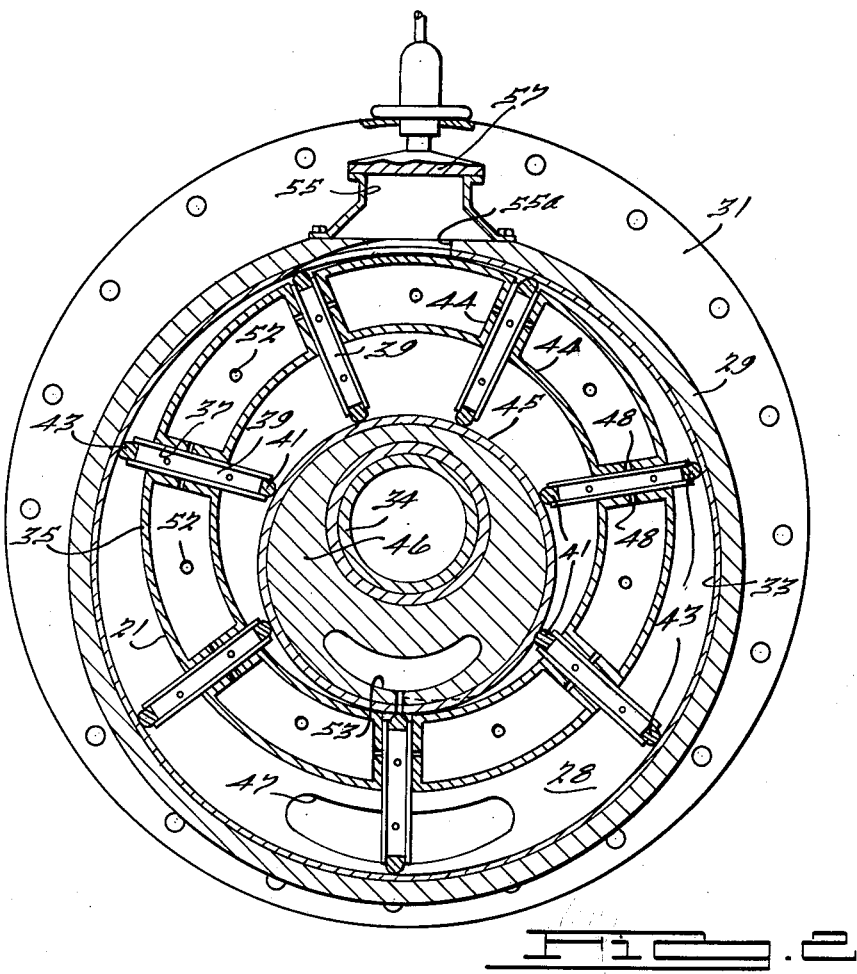

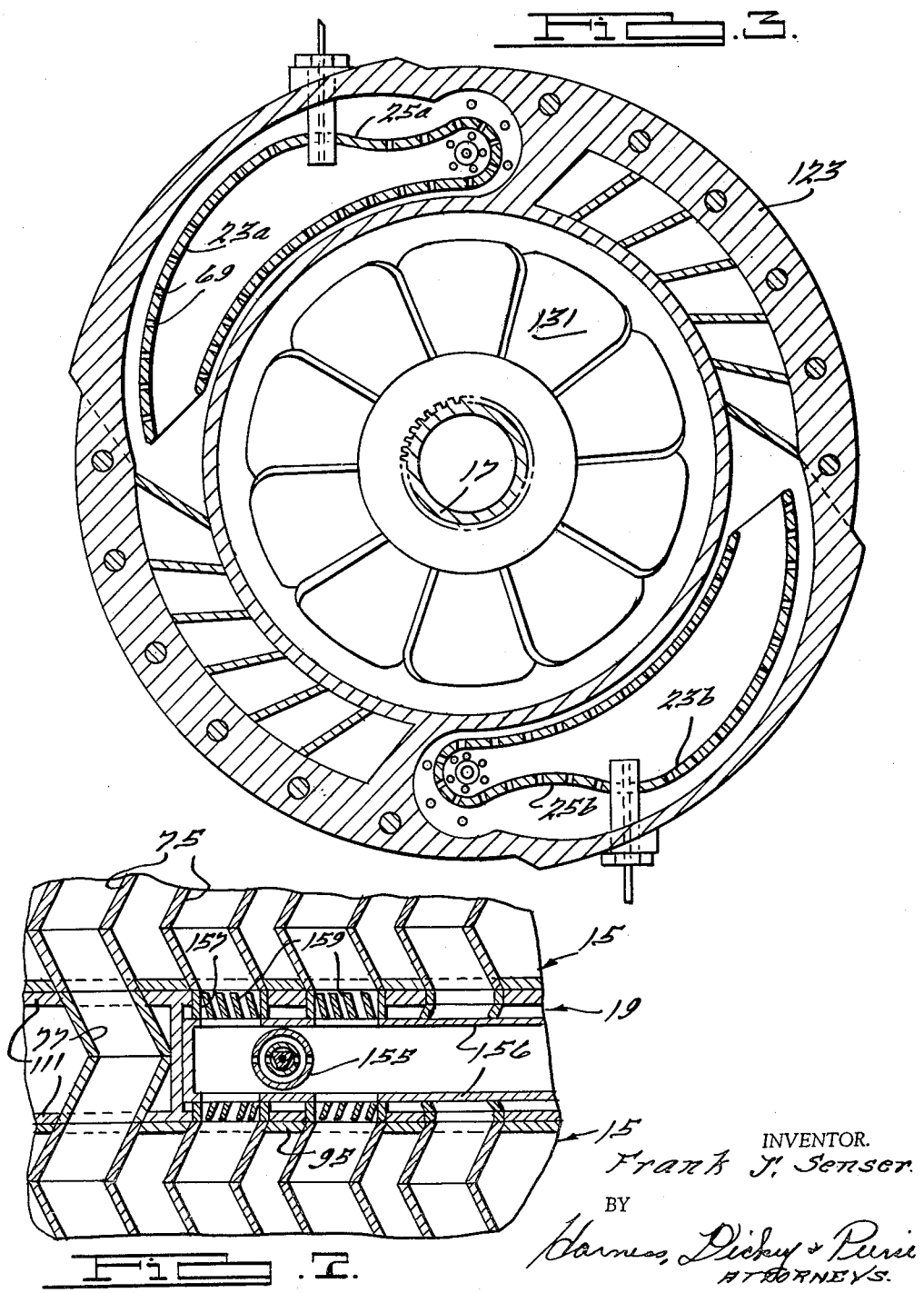

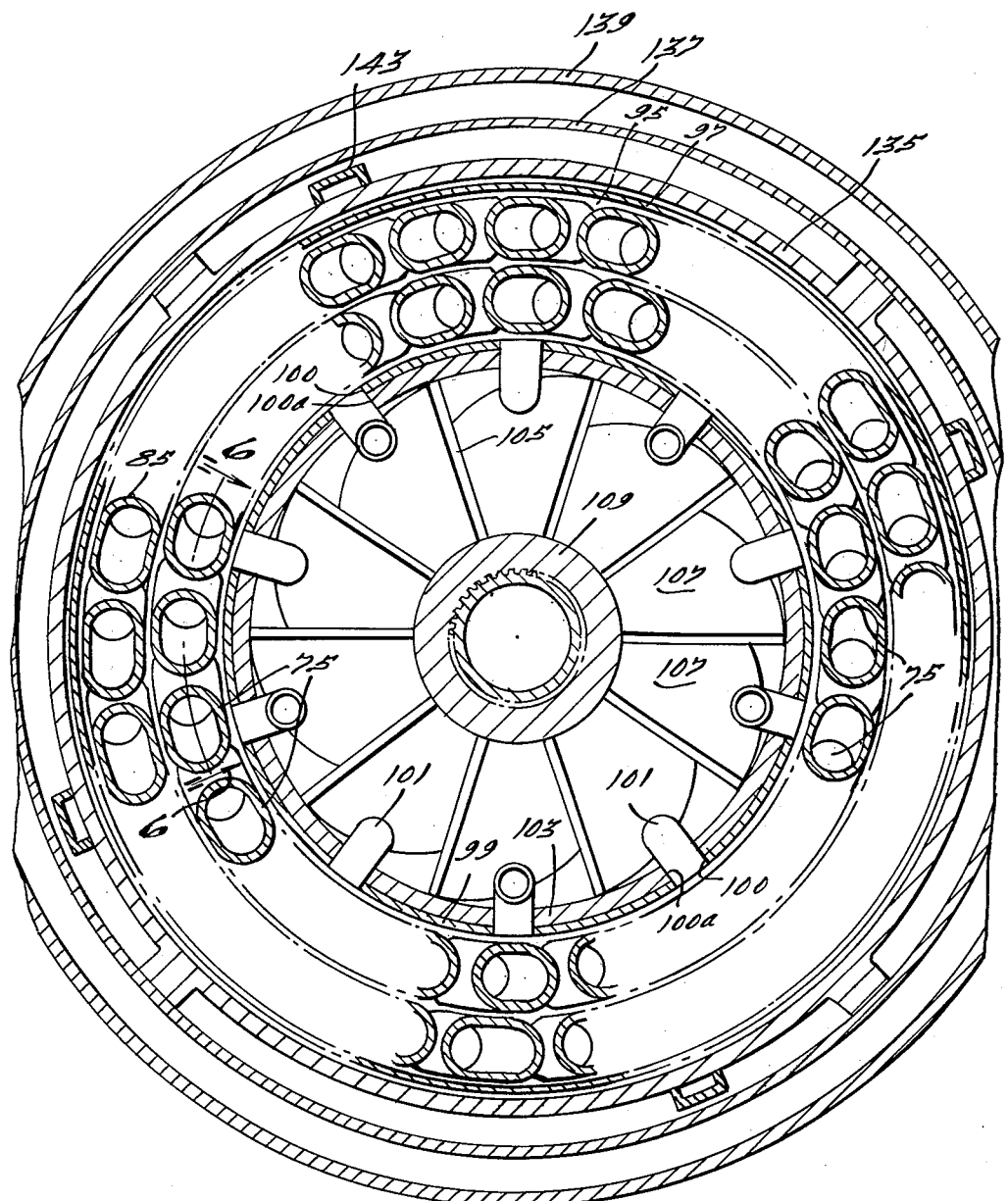

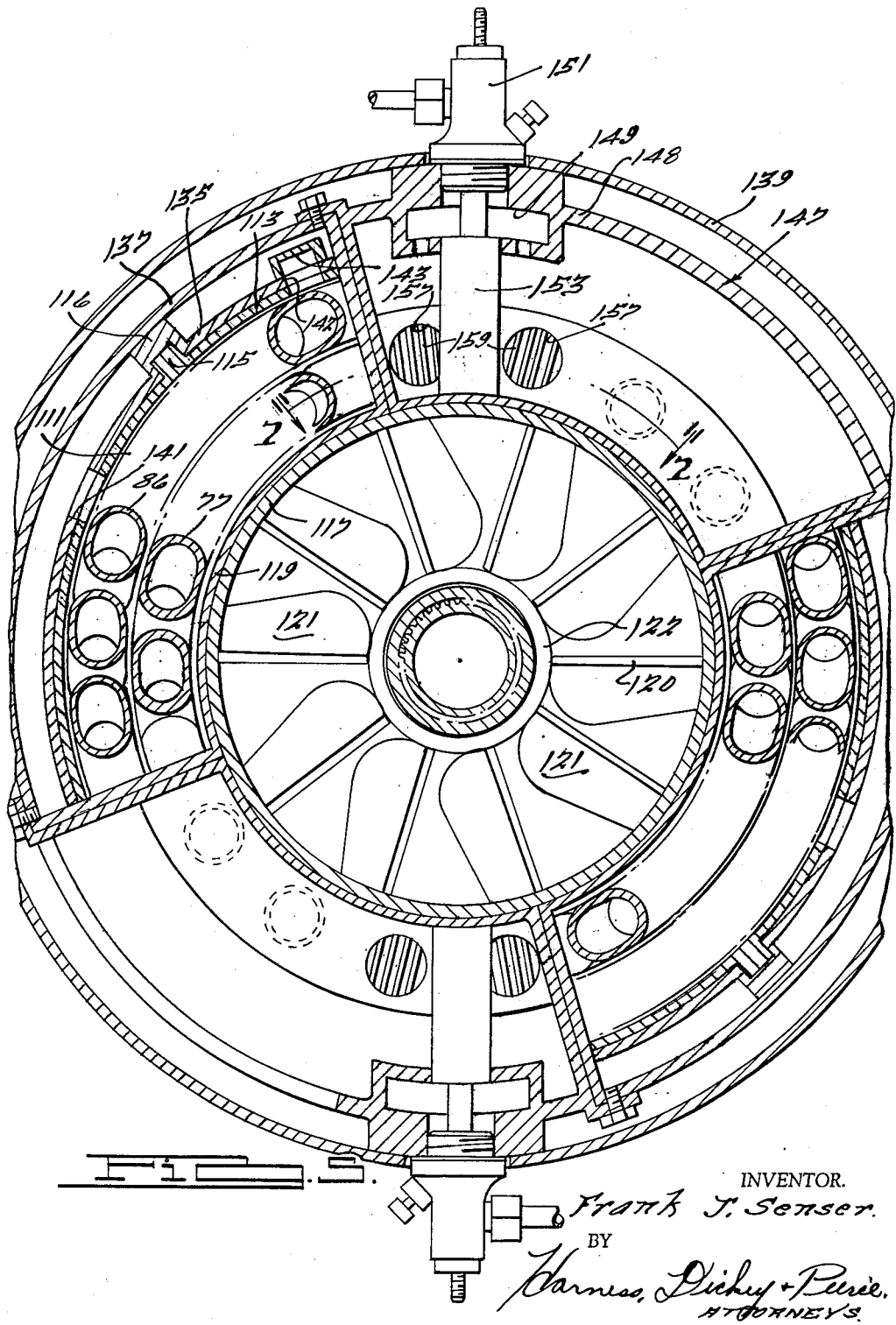

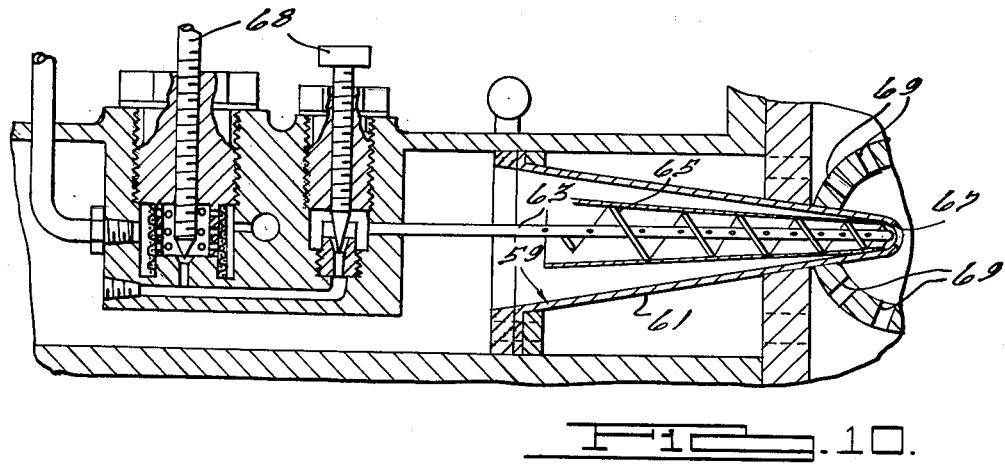
FIG. 10.
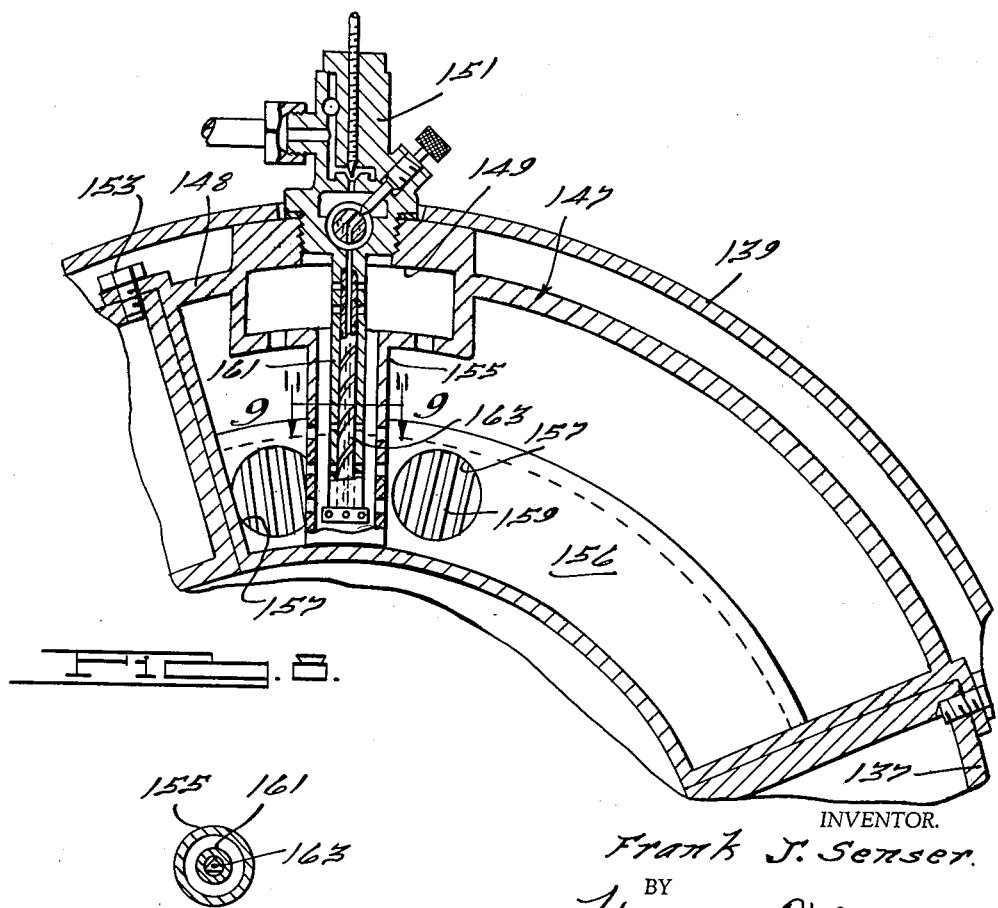
FIG. 8.
FIG. 9.
INVENTOR.
Frank J. Senser.
BY
Barnes, Kisley & Pines
ATTORNEYS.

3,078,671
GAS TURBINE POWER PLANT
Frank J. Senser, Mount Clemens, Mich., assignor, by mesne assignments, to Van Houten, Inc., Detroit, Mich., a corporation of Michigan
Filed Aug. 3, 1959, Ser. No. 831,211
2 Claims. (Cl. 60—39.37)

This invention relates to power plants, and particularly to a multistage gas turbine power plant comprising a compressor supplying air to a combustion chamber from which the expanding products of the combustion are emitted to drive rotors within the turbine and thereby rotate a shaft, a part of the power supplied to the shaft being used to drive the compressor.

It is an object of the present invention to provide a gas turbine power plant which is compact in size, light in weight, and sturdy in construction.

It is another object of the present invention to provide a gas turbine power plant having a supplemental or secondary compressor for supplying cooling air through the unit, the air from said secondary compressor, after it has become heated, being then used to feed supplementary fuel injectors downstream from the main combustion chamber.

It is a further object of the present invention to provide a gas turbine power plant having improved means for the circulation of cooling air therethrough, thereby permitting the use of more common and less expensive metals in the construction of the unit than have heretofore been possible in gas turbines operating at extreme elevated temperatures.

It is a further object of the present invention to provide a gas turbine power plant of extremely high efficiency having a very low heat loss, and which may be utilized in a variety of applications.

It is a still further object of this invention to provide a gas turbine power plant having a compressor which is capable of compressing air to extremely high pressures, which is fully balanced against dynamic forces to permit its operation at high rotational speeds, and which possesses an efficient lubricating system.

It is another object of the present invention to provide a turbine of the above character having a series of rotor and stator disks which incorporate hollow, blade-type elements defining two separate annular expansion channels, one located inside of the other, said channels being interconnected at the rear end of the turbine to pass the exhausted gases from the first channel back through the turbine a second time via the second channel, thus assuring transformation of all remaining kinetic energy in the gas into motive power.

It is still another object of the present invention to provide a gas turbine of the above character in which the turbine rotors and stators incorporate compressor blades located radially inwardly of the power impulse or reaction elements to provide a secondary cooling compressor which is operated by the rotation of the turbine rotors.

It is a further object of the present invention to provide a gas turbine power plant of the above character having the improved means for cooling the bearings which support the drive or power shaft.

It is a still further object of the present invention to provide a gas turbine power plant of the above character having means for preheating the fuel, the exhausted products of combustion being utilized for this purpose.

It is still another object of the present invention to provide a gas turbine power plant which may be easily assembled and disassembled and which may be readily constructed from inexpensively fabricated parts.

These and other objects of the present invention will become apparent from the following detailed description, taken in conjunction with the accompanying drawings wherein:

FIGURE 1 is a longitudinal sectional view of a gas turbine power plant embodying the principles of the present invention;

FIG. 2 is an enlarged sectional view of the structure illustrated in FIG. 1, taken along the line 2—2 thereof;

FIG. 3 is an enlarged sectional view of the structure illustrated in FIG. 1, taken along the line 3—3 thereof;

FIG. 4 is an enlarged sectional view of the structure illustrated in FIG. 1, taken along the line 4—4 thereof;

FIG. 5 is an enlarged sectional view of the structure illustrated in FIG. 1, taken along the line 5—5 thereof;

FIG. 6 is a reduced fragmentary sectional view of the structure illustrated in FIG. 4, taken along the line 6—6 thereof;

FIG. 7 is a fragmentary sectional view of the structure illustrated in FIG. 5, taken along the line 7—7 thereof;

FIG. 8 is an enlarged sectional view of a portion of the structure illustrated in FIG. 1, taken along the line 8—8 thereof;

FIG. 9 is a sectional view of the structure illustrated in FIG. 8, taken along the line 9—9 thereof; and FIG. 10 is an enlarged fragmentary view of a portion of the structure illustrated in FIG. 1.

Referring now to the drawings and particularly to FIG. 1, it will be seen that the power plant generally includes two separate sections: a primary compressor unit 11 and a turbine unit 13. The turbine unit 13 includes a plurality of generally disk-shaped rotor units 15 which are alternately splined on a central drive shaft 17 between a plurality of spacer sleeves 18 so as to lie between generally disk-shaped stator units 19. Rotation of the rotors 15 serves to rotate the shaft 17 which, in turn, drives a compressor rotor body 21 to supply highly compressed and heated air to two primary combustion chambers 23a and 23b, formed by generally tubular members 25a and 25b.

The rotating body member 21 of the primary compressor 11 is enclosed within a housing formed by a front plate 27, a ring 28, a cylinder 29 and a housing member 30. The cylinder 29 is provided wtih a flange portion 31 which is secured to the front plate 27 by any suitable fastening means such as bolts 32 with the ring 28 interposed therebetween. The inner surface of the cylinder 29 is fitted with a hardened metal liner 33 which serves as a bearing surface, as will be subsequently explained.

The liner 33 is disposed eccentrically with respect to a central shaft 34 co-rotatably connected to the drive shaft 17 at the forward end thereof. The compressor body member 21 is drivably mounted on the shaft 34 and includes a hollow annular portion 35 supported by a radial wall 36 and having a plurality of spaced radially disposed slots 37 which carry reciprocating blades 39. The blades 39 are rectangularly shaped and are fitted at their inner and outer edges with wipers 41 and 43, respectively. The outer wiper 43 bears against the hardened liner 33 during the rotation of the body member 21 and the inner wiper 41 smoothly contacts an inner hardened liner 45 fitted over a cylindrical hub 46 formed integrally with the housing member 30. The annular portion 35 is coaxial with respect to the shaft 34 and thus is dynamically balanced under rotational speeds. On the other hand, the hardened liners 33 and 45 are disposed coaxially with respect to each other, but eccentrically with respect to the annular body member portion 35 and the shaft 34. The relative eccentric position of the annular portion 35 serves to divide the annular area between the liners 33 and 45 into inner and outer compression chambers. An inner compression chamber is formed between the inner diameter of the annular portion 35 and the liner 45 while an outer compression chamber is formed between the outside diameter of the annular portion 35 and the liner 33.

As the body member 21 is rotated, the inner wipers 41 ride on the liner 45, while the outer wiper 43 rides on the liner 33. During each revolution, each of the blades 39 reciprocates in and out relative to the slot 37 in which it is carried. As will be seen in FIG. 2, the area existing ahead of each blade 39, both internally and externally of the annular portion 35, varies according to the rotational position of the body member 21. During one-half of the revolution the fluid ahead of each blade in the outside combustion chamber is being compressed while the area ahead of the same rotors in the interior combustion chamber is expanding.

In operation, the compressor serves to supply each of the primary combustion chambers 23a and 23b with a separate supply of compressed air. In order to provide a continuous supply of air into the outer combustion chamber, the front plate 27 and ring 28 are provided with aligned inlet openings 47 and 47a, respectively, which admit air to the outer combustion chamber at the point of maximum volume thereof. The air compressed within the outer compression chamber is then discharged into the combustion chamber 25a through a casing 55, the discharge being regulatable by a valve element 57. The compressed air from the outer compression chamber enters the casing 55 through a series of transversely spaced openings 55a and 55b which are milled out of cylinder 29 and liner 33, respectively. The milled openings 55a and 55b are of tapered depth and, being spaced, leave a portion of the liner 33 therebetween on which the wipers 43 can ride in passing over the openings. Air is admitted to the inner combustion chamber through an inlet opening 51 and is discharged into the combustion chamber 25b through an outlet opening 53 formed in the housing member 30. The outlet opening 53 is discontinuous adjacent the inner liner 45 and the liner 45 is provided with registering openings 53a to permit the passage of outgoing air therethrough.

As may be seen in FIG. 2, the annular rotor body portion 35 is generally hollow, that is, it is provided with a series of chambers 44 between each of the slots 37. A plurality of oil ports 48 are formed in the portion 35 providing communication between each of the chambers 44 and the slot 37 on either side thereof. Thus, each of the chambers 44 serves as an oil storage reservoir from which oil is free to flow into contact with the sides of the blades 39 during their reciprocation for purposes of lubricating the same. The chambers 44 are filled through oil ports 52 which are normally closed by cap screws. As will be seen in FIG. 1, rotary support for the body member 21 and shaft 34 is provided by a pair of axially spaced bearings 54 and 56 on opposite sides of the body member 21.

The combustion chambers 25a and 25b are disposed 180 degrees apart and thus the expanding products of combustion emitted therefrom bear equally against the opposite sides of the rotors in the turbine unit. A portion of the air flowing to the combustion chambers is first passed through a fuel injection nozzle 59 having an inwardly tapered sleeve portion 61 and a perforated tube 63 out of the sides of which a fine jet stream is continuously sprayed. In order to fully distribute the spray of fuel within the sleeve 61 a spiral vane 65 is mounted on the rod 63 to enhance the mixing of the fuel with the compressed air. The fuel and air mixture eventually emerges through an orifice 67 provided at the end of the sleeve 61 and located within the combustion tubes 25a and 25b. The combustion tubes 25a and 25b are provided with a large number of small perforations 69 through which a portion of the compressed air which by-passes the nozzle 59 is admitted into the combustion tubes 25a and 25b to further mix with the fuel/air mixture dispensed through the fuel injector nozzle 59.

As may be seen in FIG. 1, the exploded gases passing from the combustion chamber flow into and through a first annular power expansion channel 71 formed by a plurality of annularly arranged bent elbows or hollow reaction members 75 carried by each of the rotor disks 15 and a plurality of annularly arranged bent elbows or hollow reaction members 77 carried by the stator disks 19. The elbows 75 and 77 are in registry with one another and, among other things, accomplish the usual function of rotor and stator blades. The rotor elbows 75 absorb the impulse force of the moving and expanding products of combustion, transforming its kinetic energy into motive power by the rotation of the rotors 15 and drive shaft 17. The stator elbows 77 deflect the moving gas and in effect serve as nozzles to direct the gas toward the rotor elbows from the correct direction to produce the desired rotation of the rotors. The entire stator disks 19 and their elbows 77, of course, remain stationary. However, the elbows 77 may be considered as being included with the rotor elbows 75 in the expression "reaction members" as used herein.

Upon reaching the end of the first expansion channel 71 the direction of travel of the products of combustion is reversed by an annular cover member 79 of arcuate or concavo-convex cross section. The member 79 serves to direct the moving gases to a second or outer expansion channel 81 surrounding the first expansion channel and defined by tubular bent elbows 85 carried by the rotor disks 15 and tubular bent elbows 87 carried by the stator disks 19. The elbows 85 and 87 are arranged circumferentially on their respective rotors and stators and radially outwardly of the elbows 75 and 77. Of course, the direction of inclination of the elbows 85 and 87 is reversed from that of the elbows 75 and 77 in view of the opposite direction of the fluid medium moving therethrough and in order to assure that the reactive force received by the rotors 15 will be in the same direction as that applied through the elbows 75. After the products of combustion have travelled forwardly through the second expansion channel 81, they are finally exhausted to the atmosphere through an exhaust pipe 89.

The construction of the individual rotor disks is best seen in FIGS. 1 and 4. The bent elbows 75 and 85 are supported between a pair of annular supporting side plates or wall portions 95 which are suitably apertured to receive the opposite ends of the bent elbows 75 and 85, which may be welded or otherwise secured therein. The outer periphery of each rotor is enclosed by an outer ring member 97 while an inner ring 99 completely encloses the elbows 75 and 85 adjacent the inside diameter of the side plates 95. Each rotor is supported on the drive shaft 17 by a central hub 109 which is internally splined to mesh with splines on the drive shaft. A plurality of radial spokes or ribs 105 rigidly interconnect the hub 109 to an annular supporting member 103 which is secured to the inside diameter of the inner ring 109. In addition, the spokes 105 each form a base for a compressor blade 107 which in turn form a part of a secondary compressor 108 located within the expansion or power channels 71 and 81. Thus, the rotation of the rotors 15 under the impulse force received by the elbows thereon operates the secondary compressor 108 by rotation of their blades 107.

It will, of course, be apparent that the products of combustion and exploding gases passing through the rotor elbows 75 and 85 tend to heat said elbows to rather high temperatures. In order to dissipate this heat, means is provided for the circulation of a cooling air within each rotor disk 15 and around the elbows 75 and 85. For this purpose, sets of aligned openings 100 and 100a are provided in the inner ring 99 and the supporting member 103, respectively, which are fitted with breather pipes 101. The pipes 101 are of right-angular form and are alternately faced forwardly and rearwardly on each rotor. Thus, air from the compressor 108 is forced into the forwardly open pipes 101, is circulated around the elbows 75 and 85 and is drawn out of the rotors through the rearwardly open pipes to continue downstream to the secondary compressor.

Each of the rotor disks 15 is of the construction just described, with the exception of the first two in the turbine; that is, the first two at the left-hand end of the turbine as viewed in FIG. 1. These two rotor disks are designated 15a and are of a smaller diameter than the remaining rotor disks 15 for the reason that they do not include the outer elbows 85 but terminate adjacent the elbows 75 defining the first annular expansion channel 71. Surrounding the rotors 15a are annular chambers 106 in alignment with and forming an extension of the second expansion channel 81. Disposed within this chamber is a pipe 165 through which fuel is pumped prior to its injection into the combustion chambers 25a and 25b. The products of combustion passing out of the turbine through the second annular expansion channel 81 pass over the pipe 165 and, by their high temperature, maintain the pipe 165 in a heated condition.

Construction of the stator disks 19 is best seen in FIGS. 1 and 5 wherein the inner and outer elbows 77 and 86 are shown as supported between spaced parallel and annular side plates or wall portions 111 which are suitably apertured to receive the opposite ends of said elbows. The elbows may be welded or otherwise secured to the side plates 111 in any suitable manner and are thus held in their spaced annular arrangement by said side plates. The outer periphery of the stator disks is closed by an outer cylindrical ring 113 which is provided with a plurality of spaced longitudinally extending keys or lugs 115 fitted within correspondingly located keyways or channels 116 formed in a cylindrical housing member 135. By this means, the stators 19 are held in position in the turbine and are securely locked against rotation. An inner cylindrical ring member 119 joins the inner diameters of each of the side plates 111 of each stator to completely enclose the elbows 77 and 86. In certain of the stators, such as the stator illustrated in FIG. 5, the inner and outer ring members 119 and 113, as well as the side plates 111, are discontinuous to provide room for a pair of diametrically opposite fuel injector stator housings 147 enclosing and supporting supplementary fuel injectors 145. The discontinuous parts of the inner and outer rings 119 and 113 and side walls 111 are mounted on an annular supporting member 117 which is in turn connected to a central annular hub portion 122 by a plurality of radial spokes 120. A compressor blade 121 is supported by each of the spokes 120 and cooperates with the blades 107 on the rotor disks 15 in forming the secondary compressor 103.

While the spacers 18 which are interposed between the rotor disks 15 are in actual abutment with the hubs 109 of the rotors, the central annular hub portions 122 of the stator disks have running clearance with all parts of the rotors. Similarly, a running clearance exists between the side plates 95 of the rotor disks and the side plates 111 of the stator disks, but said side plates are sufficiently close together to prevent excessive loss of the fluid medium traveling down the expansion channels 71 and 81.

As may be seen in FIG. 5, the fuel injector housings 147 are spaced approximately 180 degrees apart. While the supplementary fuel injectors may be provided in any desired number of stators, there are preferably six in number. While four may be seen in FIG. 1, the remaining two are desirably positioned in the stator between the two stators in which the fuel injectors are seen in FIG. 1. However, the fuel injectors in said middle stator are preferably rotated 90 degrees out of alignment with the other supplementary fuel injectors and hence are not visible in the sectional view forming FIG. 1. The construction and operation of the supplementary fuel injectors 145 and their housings 147 will be hereinafter explained.

The rotors and stator disks are enclosed within the cylindrical housing member 135 which is secured to a front housing member 123 at the forward end thereof and to a rear housing member 125 at its rear end. Spacedly surrounding the housing member 135 is a thin walled cylindrical intermediate casing 137 which, together with the housing 135, forms an annular air duct 138 around the housing 135. An outer shroud 139 is in turn spaced around the casing 137 but serves merely as a protective shield. Fluid communication is provided to the air duct 138 from the secondary compressor 103 enclosed within the annular supporting members 117 and 103 of the stators and rotors, respectively, by means of a pair of spaced annular and arcuate rear cover members 133 and 134. The member 133 may be made as a continuation of the intermediate casing 137, if desired. Thus, partially heated air is forced down the duct 138, where it is utilized in and becomes further heated from the cooling of the stator disks 19. For this purpose, a plurality of rearwardly open cup members 143 are secured to the periphery of the housing member 135 over openings 142 (FIG. 5) formed therein and which are open to the interior of the stator disks to permit air to flow around the elbows 77 and 86. Such air subsequently flows out of the stators through openings 141 in the housing member 135.

After having cooled both rotors and stators, the air from the secondary compressor becomes heated to a rather high temperature and this heated air is utilized to supply air to the supplementary fuel injectors 145 for mixture and burning with the fuel discharged thereby. In this connection, the outer wall 148 of each fuel injector housing 147 is provided with an integral duct portion 149 which is closed at its forward end and open at its rearward end to receive the forwardly moving air in the duct 138. The duct portion 149 is formed with an integral inwardly projecting perforated tube 155 which is open to the duct portion 149 for the movement of the air in the duct 138 therethrough. The injector housing is closed on both of the lateral sides thereof, as well as at its bottom. In addition, it is sealed off from the elbows of the adjacent rotors on the opposite sides thereof by a pair of spaced barriers 156 having aligned ports 157 fitted with spaced and inclined baffles 159. Thus, a mixing chamber is formed between the barriers 156 into which the heated air from the duct 138 and vaporized fuel from the fuel injector 145 flows.

The fuel injectors 145 are provided with body portions 151 adapted to screw directly into the housing 147 and having integral inwardly projecting hollow and perforated rod portions 161. A spiral fuel mixer 163 of triangular cross section is fitted within the rod portion 161 of each fuel injector to agitate and enhance the vaporization of the fuel flowing down the rod 161 from the body portion 151. It will be noted that fuel is free to escape out of the rod portion 161 through the perforations in various locations along the length thereof. It will be seen that the tube portion 149 within which the rod 161 is positioned extends directly through the second annular expansion channel 81 and thus the gases flowing therethrough are in direct heat exchange relationship therewith. By this means, the tube portion 149 and rod portion 161 are maintained at a constantly high temperature to enhance the vaporization of the fuel dispensed by the supplementary fuel injectors. The vaporized fuel, upon passing into the tube portion 155 through the perforations in the rod portion 161, mixes with the air from the duct 138 and then flows into the mixing area between the barriers 156. The fuel/air mixture then flows out of the injector housing 147 through the ports 157 and into the first annular expansion chamber 71, where it ignites upon mixture with the gases flowing from the primary combustion chambers 25a and 25b. The baffles 159 prevent the entry of the flame back into the housing 147, while the barrier 156 on the downstream side of the housing 147 serves to deflect the exploding fuel from the supplementary fuel injectors rearwardly against the adjacent rotor and thus assures rearward movement of the exploding gases from the supplementary fuel injectors.

As can be seen in FIG. 1, the drive shaft 17 is supported by a pair of bearings 129 and 130. The bearing 130 is supported by the rear housing member 125 and is sufficiently exposed to be free from substantial heat problems. The bearing 129 is supported by a bearing support member 127 bolted to the housing member 30. A fan blade 131 is keyed to the drive shaft 17 adjacent the bearing 129 and it not only directs atmospheric air into the secondary compressor 108 but draws such air over the bearing 129 in order to cool the same.

The turbine 13 is easily assembled by first inserting a rotor 15 in the drive shaft and then a spacer 18. Next, a stator 19 is inserted in the housing member 135 with its keys 115 fitted in the keyways 116. The stators are inserted without their injector housings 147 and before the shroud 139 is installed. After all of the rotors 15 and the stators 19 have been alternately installed, in turn, the injector housings 147 are fastened in place in the stators. Next, the shroud 139 is sleeved over the entire assembly and when in place is suitably apertured to permit the supplementary fuel injector body members to be passed therethrough and screwed into the injector housings 147.

The power plant of the present invention may be started by initiating rotation of the compressor 11 by any suitable auxiliary power supply, such as a starter motor (not shown) or by forcing compressed air into one of the intakes thereof. Once the compressor body member 21 is rotating at a high speed, the air discharged thereby will be sufficiently heated by its compression to cause instantaneous combustion of the fuel in the combustion chambers 25a and 25b. The fuel is supplied to the fuel injectors by any suitable fuel pump, such as the pump 93 shown in FIG. 1 as being operated by a cam follower 91 reciprocated by a cam 81 on the shaft 34. Once the combustion begins the power of the rotating turbine is utilized to drive the compressor 11 and the auxiliary starter power is, of course, no longer necessary.

From the foregoing, it will be seen that the majority of parts of the turbine may be made from inexpensive sheet steel. Due to the efficient cooling of the unit, the steel utilized need not incorporate many costly alloy materials which have been necessary in many gas turbines heretofore used. In addition, no special turbine fuels need be utilized, but the turbine of the present invention is intended to operate to complete satisfaction on kerosene or other low-grade mixtures. In view of the preheating of the fuel and air and the construction of the power or expansion channel, maximum use is made of all kinetic and thermal energy within a power plant of a minimum size and the efficiency of the unit is of a very high order.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:
1. In a gas turbine power plant, a housing, a drive shaft, a primary compressor driven by said drive shaft, a casing defining a combustion chamber arranged to receive compressed air from said compressor, means for supplying fuel to said combustion chamber, a plurality of spaced rotors mounted on said drive shaft in said housing, a plurality of stators in said housing between said rotors, said rotors and stators having means defining a longitudinally extending expansion channel arranged to receive the products of combustion from said combustion chamber, said means including impulse receiving portions on said rotors, each of said rotors carrying a plurality of blades radially inwardly of said expansion channel adapted to form a secondary compressor moving air through said turbine in heat exchange relation with said channel defining means, a plurality of supplementary fuel injectors for injecting fuel into said expansion channel downstream of said combustion chamber, and means for supplying air to said supplementary fuel injectors from said secondary compressor for mixture with the fuel discharged thereby.

2. In a gas turbine power plant, a housing, a drive shaft, a primary compressor driven by said drive shaft, a casing defining a combustion chamber arranged to receive compressed air from said compressor, means for supplying fuel to said combustion chamber, a plurality of spaced rotor disks mounted on said drive shaft in said housing, a plurality of stator disks in said housing between said rotor disks, said rotor and said stator disks having a plurality of hollow reaction members registering to define a first annular expansion channel extending longitudinally of the turbine and a second annular expansion channel surrounding said first annular expansion channel, means at the rear of said turbine providing communication between said first annular expansion channel and said second annular expansion channel and operable to reverse the direction of flow of the products of combustion flowing down said first annular channel and direct it reversely back to said second annular channel, and supplementary fuel injectors in said stator disks extending through said second annular channel and injecting fuel into said first annular channel, said fuel injectors being in heat exchange relation with the products of combustion passing through said second annular channel to preheat the fuel injected thereby, blade means carried by each of said rotors radially inwardly of said reaction members, said blade means defining a portion of a secondary compressor operable to move air along the inner diameter of said expansion channel, means directing the air compressed by said secondary compressor to said supplementary fuel injectors for mixture with the fuel injected thereby.

References Cited in the file of this patent
UNITED STATES PATENTS

| | | |
|---|---|---|
| 878,799 | Haven | Feb. 11, 1908 |
| 990,781 | Ross | Apr. 25, 1911 |
| 1,187,298 | Fujita | June 13, 1916 |
| 2,019,879 | Wahlstrom | Nov. 5, 1935 |
| 2,280,271 | Sullivan | Apr. 21, 1942 |
| 2,303,589 | Sullivan | Dec. 1, 1942 |
| 2,407,164 | Kimball | Sept. 3, 1946 |
| 2,479,777 | Price | Aug. 23, 1949 |
| 2,489,683 | Stalker | Nov. 29, 1949 |
| 2,505,660 | Baumann | Apr. 25, 1950 |
| 2,633,705 | Hawkins | Apr. 7, 1953 |
| 2,706,451 | Mayer | Apr. 19, 1955 |
| 2,783,965 | Birmann | Mar. 5, 1957 |
| 2,841,362 | Yeomans | July 1, 1958 |
| 2,867,085 | Saboe | Jan. 6, 1959 |

FOREIGN PATENTS

| | | |
|---|---|---|
| 23,123 | Great Britain | Oct. 18, 1906 |
| 290,014 | Great Britain | May 10, 1928 |